United States Patent Office 3,401,600
Patented Sept. 17, 1968

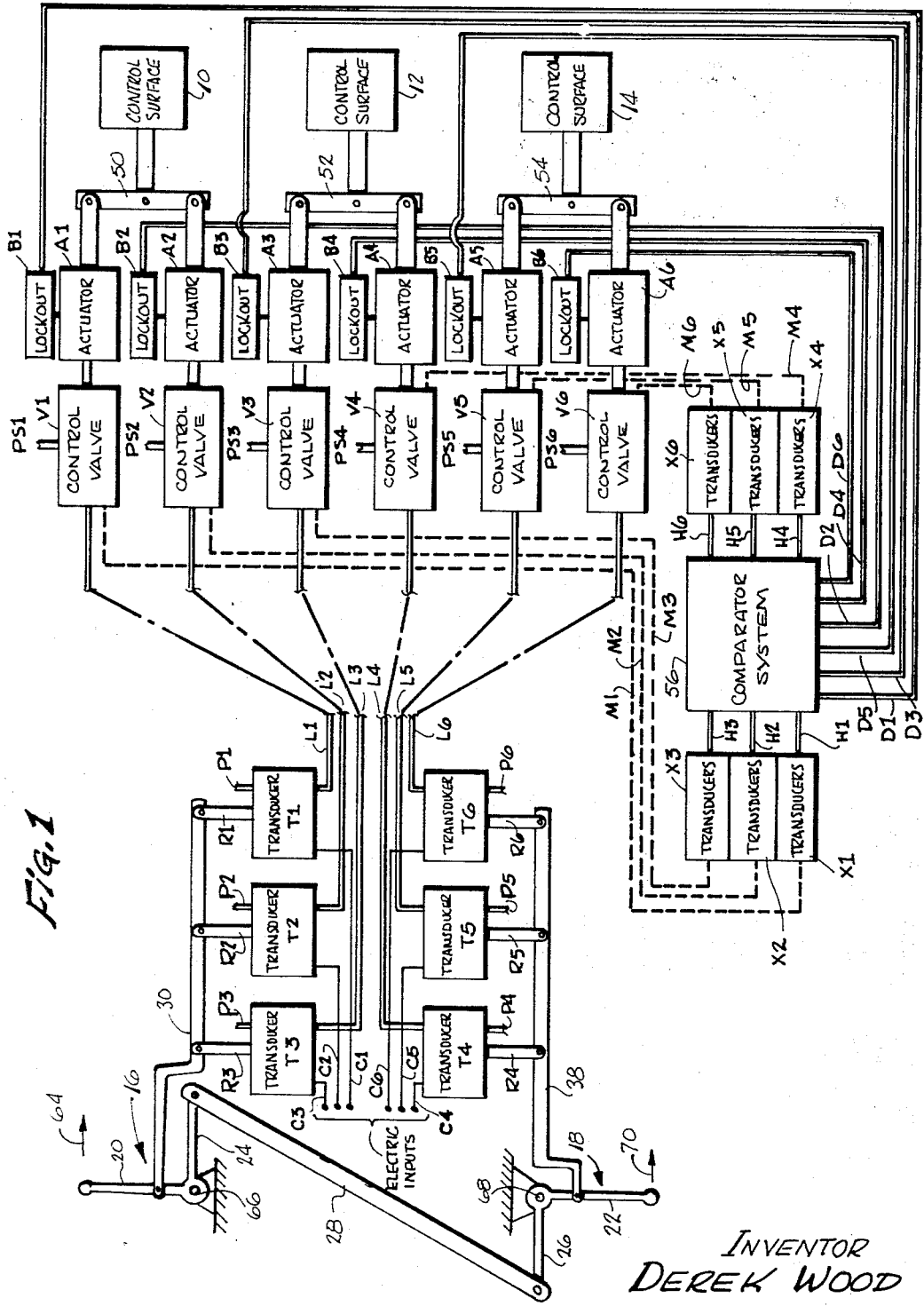

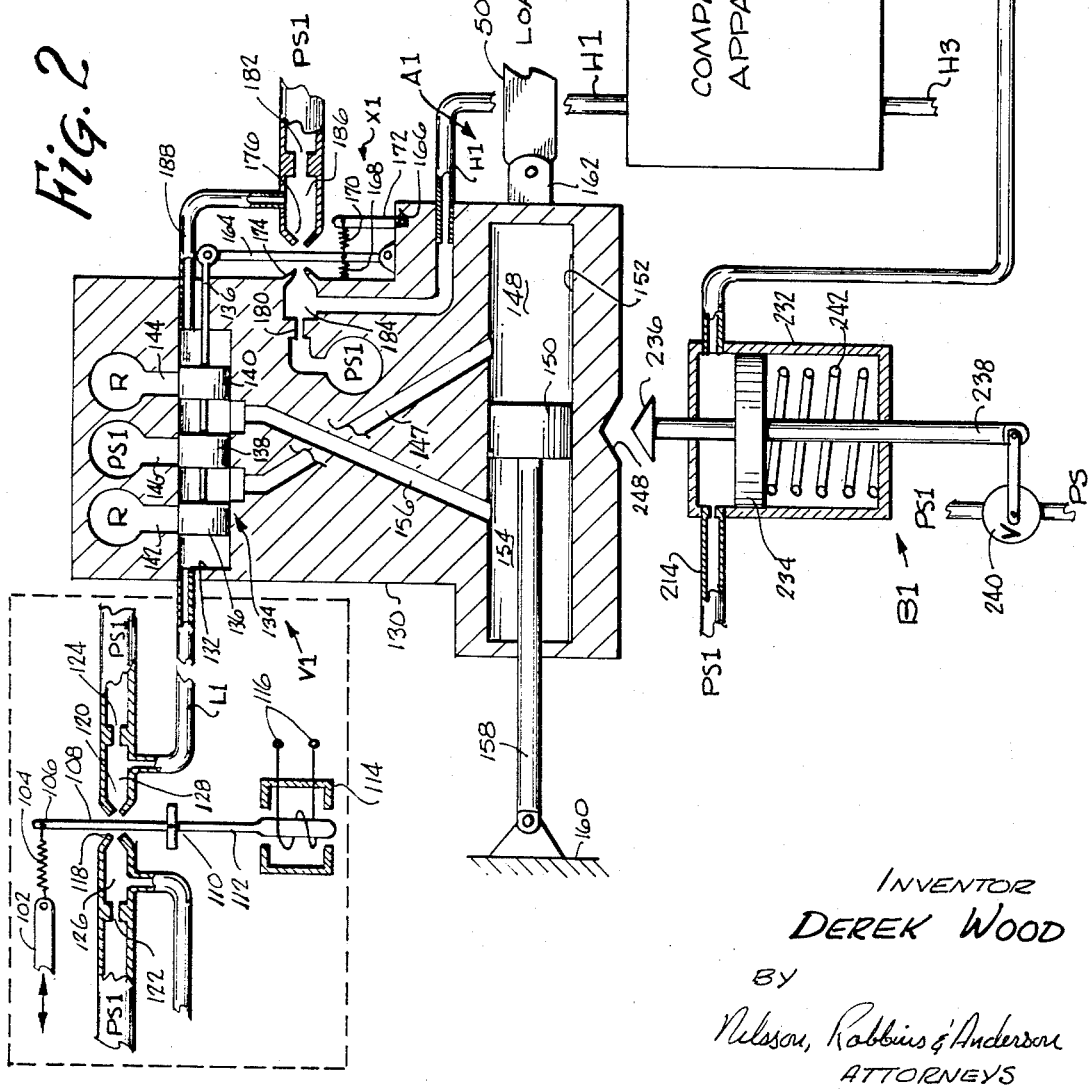

3,401,600
CONTROL SYSTEM HAVING A PLURALITY
OF CONTROL CHAINS EACH OF WHICH
MAY BE DISABLED IN EVENT OF FAILURE
THEREOF
Derek Wood, Sun Valley, Calif., assignor to Bell Aerospace
Corporation, a corporation of Delaware
Filed Dec. 23, 1965, Ser. No. 515,822
10 Claims. (Cl. 91—44)

ABSTRACT OF THE DISCLOSURE

Disclosed is a redundant control system having a plurality of control chains each connected to position a movable member pursuant to input control signals. Each of the chains includes a first transducer receiving input signals such as from a manual input (pilot's control stick) and other inputs (stability augmentation and/or autopilot). The first transducer responsive to the input signals provides an out hydraeric pressure control signal. The pressure signal is connected to a remotely positioned control valve which controls the flow of hydraeric fluid to an actuator which is coupled to the movable member (aircraft control surface). A second transducer is connected to the control valve and produces a hydraeric pressure monitor signal, respresentative of the position of the control valve. The monitor signals from the plurality of control chains are compared in a comparator apparatus which generates a disabling signal in the event of nonconformity between monitor signals. The disabling signal activates disabling apparatus which disables that control chain not conforming to the remainder of the system control chains.

---

The present invention relates to control systems and more particularly to a hydraeric-mechanical control system that may be provided in a plurality to accomplish a highly reliable redundant system.

The technique of employing power to position the control surfaces of an aircraft in accordance with control movements by the pilot (as well as other input signals) has come into widespread use as a result of the weight and size of control surfaces embodied in present day aircraft. Of course, various techniques have been employed whereby manual control motoins are translated to drive the control surfaces. For example, indirect control has been accomplished by various combinations of mechanical, electrical and hydraulic elements. However, as such systems have been rather complex, reliability has sometimes dropped. Yet, aircraft embodying power control normally demand a high level of reliability. As a result, redundant systems have been developed in which several separate, duplicate control chains are provided to increase reliability. Various techniques have also been proposed for rendering a control chain ineffective in the event of its failure. Usually, because the pilot is not capable of detecting a failure in sufficient time to provide effective correction, the operation of disabling a particular control chain is performed automatically.

Various forms of these control systems have normally included electrical circuits and mechanical linkages. In general, electrical and electornic apparatus is rather complex and sensitive, while extended mechanical linkages are somewhat subject to failure. As a result, a need exists for an effective nonelectrical control system of limited mechanical structure, and which may be incorporated in a redundant system with the facility to selectively disable an inoperative portion of the system.

Accordingly, it is an object of the present invention to provide an improved form of such a control system utilizing hydraeric (pneumatic or hydraulic) pressure control signals to accomplish control of an aircraft control surface for example, or other movable member.

It is another object of the present invention to provide a redundant control system for selectively positioning movable members which system effectively disables a portion thereof upon occurrence of a failure in a portion, which portion then remains disabled until repaired and reset.

Another object of the present invention is to provide a hydraeric control system which include only limited mechanical linkages.

It is a further object of the present invention to provide a nonelectrical control system which is highly reliable in operation yet which is relatively simple to manufacture and maintain.

Still a further object of the present invention is to provide a control system utilizing hydraeric pressure control signals, in which the failure of a component is very rapidly detected and may therefore be substantially immediately disabled.

Additional objects and advantages of the present invention will be apparent to one skilled in the art from a consideration of the following description taken in conjunction with the accompanying drawings which are presented by way of example only, and are not intended as a limitation upon the scope of the present invention as defined in the appended claims and in which:

FIGURE 1 is a diagrammatic representation of a redundant control system constructed in accordance with the present invention;

FIGURE 2 is a detailed diagrammatic illustartion of a single control chain portion of the system of FIGURE 1; and FIGURE 3 illustrates one form of pressure montior signal unbalance detecting unit which may be employed in the system of FIGURE 1.

A control system for positioning movable members in accordance with the present invention may be provided in a redundant system embodiment by incorporating several individual control chains, each of which serves to position a movable member. In an illustrative embodiment of this system, the movable members may comprise the control surfaces of an aircraft which generally accomplish the same purpose so that control of the aircraft is not lost upon loss of the ability to control one, or even several of the control surfaces, so long as some control remains.

In the illustrative system, an individual control chain may include a transducer for translating the pilots manual control movements (along with other control signals) into a hydraeric pressure control signal which is communicated through a pressure line to a location near the member to be controlled. At that location, the hydraeric pressure control signal is applied to a control valve (as a hydraeric amplifier) to provide a physical displacement that is representative of the hydraeric signal. The physical displacement of the valve then controls fluid pressure to drive an actuator which is in turn connected to the movable member. Furthermore, the movement of the valve is translated into a hydraeric feedback signal to stabilize the operation of the valve and is also translated into a hydraeric monitor signal which may be compared with similar signals from other control chains to detect a nonconforming chain. The system may further incorporate structure for disabling a nonconforming control chain and locking the related control surface of such a chain in a neutral or ineffective position.

Referring now to the drawings and more particularly to FIGURE 1, thereof, a system in accordance with the present invention is illustrated. As shown, three movable members, represented by control surfaces 10, 12 and 14

(extreme right) are the objects of control positioning. The control information is provided by physical displacement of manual controls 16 and 18 (extreme left). The controls 16 and 18 are interconnected dual controls (as for pilot and copilot) each including a pivotally mounted lever 20 and 22, respectively incorporating transverse extensions 24 and 26 which are interconnected by a link 28. Therefore, manual movement of either of the levers 20 or 22 produces a similar movement of the other lever.

The lever 22 is connected through a translating linkage 30 to three perpendicularly extending arms R1, R2 and R3. In a similar manner, a linkage 38 connects the lever 22 to three perpendicular arms R4, R5 and R6. This mechanical arrangement including the manual controls 16 and 18 results in the application of a representative mechanical signal or physical displacement to each of six transducers T1, T2, T3, T4, T5 and T6 which are individually coupled respectively to the arms R1, R2, R3, R4, R5 and R6.

In addition to receiving manually-applied control signals, the transducers T1 through T6 also receive electrical input signals through conductors C1 through C6 respectively. The signals so applied may comprise damper signals or autopilot signals as somewhat conventionally employed in various aircraft. The mechanical and electrical signals are combined within the transducers T1 through T6 to provide six independent hydraeric pressure signals that are individually transmitted through lines L1 through L6 respectively. The transducers T1 through T6 (as described in detail below) also provide six hydraeric pressure signals in lines P1 through P6 which are inversely related to the signals appearing in the lines L1 through L6. That is, for example, if a control operation is performed which causes the pressure in line L1 to rise, the pressure in a related line P1 will drop. The lines P1 through P6 are thus related, to control opposed surfaces, for example.

The purpose of providing inverse signals arises in several applications, for example, it is frequently desired to provide opposed control signals to the two wings of an aircraft. Therefore, the signals carried in the lines L1 through L6 may be employed to control the surfaces 10, 12 and 14 as shown in FIGURE 1 while the pressure signals appearing in the lines P1 through P6 may be employed in a similar system to control inverse positioning of related control surfaces.

Considering the control operation in further detail, the lines L1 through L6 transmit pressure signals contained therein to the proximity of the control surfaces 10, 12 and 14 which are to be positioned. At this location, the lines L1 through L6 are connected to control valves V1 through V6 respectively which may take the form of spool valves as disclosed below and incorporate feedback means for stabilized operation. In the operation of the control valves V1 through V6, the physical position thereof in turn positions the control surfaces by amplifying received signals through actuators A1 through A6. Specifically, the control valves V1 through V6 individually position the actuators A1 through A6 respectively which in turn act through yoke linkages 50, 52 and 54 to position the control surfaces 10, 12 and 14, respectively. Therefore, the positions of the control valves are in effect signals that are representative of the desired displacement. Those physical positions are translated by mechanical connections M1 through M6 from the control valves V1 through V6 respectively to transducers X1 through X6 respectively. The transducers X1 through X6 then provide hydraeric pressure monitor signals through lines H1 through H6 respectively, to a comparator system 56 which senses any non-conformity by one of the control chains as manifest in the monitor signal and then operates to lock the associated actuator in a neutral position. Specifically, the lines D1 through D6 from the comparator system 56 carry hydraeric pressure lock-out signals to control lock-out devices B1 through B6 which lock the actuators A1 through A6 respectively in a neutral position in the event an associated monitor signal indicates a failure.

Considering the detailed sequence of operation in the system of FIGURE 1, assume for example that the lever 20 of the manual control 16 is urged in the direction indicated by the arrow 64. As a result of this movement, the extension 24 is urged downwardly (clockwise about a pivot point 66) causing the extension 26 to be moved downwardly (counterclockwise about a pivot point 68) in turn moving the lever 22 as indicated by the arrow 70. This movement of each of the levers 20 and 22 causes the linkages 30 and 38 to be moved to the right, as shown in FIGURE 1, thereby moving each of the arms R1 through R6 to the right. This displacement of the arms R1 through R6 may be assumed to be in a direction to cause the hydraeric pressure in each of the lines L1 through L6 to rise, which signal is communicated to the valves V1 through V6 and may be assumed to urge the actuators A1 through A6 to move each of the yoke linkages 50, 52 and 54 to the right thereby accomplishing the desired control by placing each of the control surfaces 10, 12 and 14 in the desired position.

In the event that the transducers X1 through X6 sense a nonconformity in any one of the control valves V1 through V6, for example, in the valve V1, an appropriate signal will appear in one of the outputs from the comparator system 56. Specifically in the selected example, a hydraeric signal appears in the line D1 from the comparator 56 and is applied to the lock-out device B1 causing the actuator A1 to become disabled in a neutral position. Thereafter, the control surface 10 is moved only by the actuator A2 with the result that substantially half displacement operation occurs. However, such operation may be adequately compensated by system design so that the loss of one control chain is of little consequence.

Of course, the comparator system 56 may continue to perform comparisons among the monitor signals from the control chains remaining operative and continue to disable any of such chains upon an indication of nonconformity. As a result, the system may tolerate considerable failure and still continue to be sufficiently operative for the desired control function. The structure of the individual control chains may vary somewhat in accordance with various embodiments of the present invention; however, one rather-detailed illustrative form of a control chain is shown in FIGURE 2 and will now be considered in detail.

The transverse arm R1 as shown in FIGURE 1 is connected to a mechanical linkage 102 (FIGURE 2) which is in turn connected through a spring 104 to the upper end 106 of a flapper 108 supported at a pivot point 110 and integrally formed with an armature 112 of a torque motor 114. The torque motor 114 is connected to receive electrical signals at terminals 116, which, as previously indicated may comprise damper signals or signals from an autopilot as well known in the field of aircraft control.

The forces applied by the torque motor 114 and the spring 104 are summed on the flapper 108 which operates in cooperation with opposed nozzles 118 and 120. The interior of the nozzle 118 is supplied with fluid through an orifice 122 from a source PS1 of fluid under pressure. In a similar fashion the nozzle 120 is supplied from the same source PS1 through an orifice 124. Therefore, depending upon the position of the flapper 108, the nozzles 118 and 120 are variously restricted to accordingly develop hydraeric pressure control signals within the chambers 126 and 128. The signal in the chamber 126 represents the output signal to the line P1 as shown in FIGURE 1 while the pressure developed in the chamber 128 is applied through the line L1 (FIGURE 2) to the control valve V1. As it will be explained in detail, the control valve V1 variously positions the actuator A1 to in turn control a movable member (not shown) as a control surface. Furthermore, the position of the moving element in the valve V1 is sensed by a transducer X1 to develop a hydraeric monitor signal in line H1 that is applied to the comparator apparatus 56.

Considering the structure of FIGURE 2 in greater detail, the line L1 carrying the hydraeric pressure control signal passes from the transducer element to the proximity of the movable member which is to be controlled. In that proximity a block or body 130 defines a cylindrical chamber 132 into which the line L1 is coupled. The chamber 132 contains a spool valve 134 including three lands 136, 138 and 140 interconnected and coupled to a coaxial rod 136 which extends axially out of the body 130.

In a quiescent position of the spool valve 134 the lands 136 and 140 close passages 142 and 144 which are connected to a relief port R or low pressure outlet. The land 138 concurrently closes a port 146 which is connected to a source of pressure PS1. The space between the lands 136 and 138 is connected through a port 146 to the head end 148 of an actuator comprising a piston 150 slidably fitted into a cylinder 152. The drive side 154 of the cylinder 152 is connected through a bore 156 to the space between the lands 138 and 150 of the spool valve 134. The piston 140 of the actuator is tied by a connecting rod 158 to a fixed support 160; however, the body 130 is movable relative the piston 150 and is attached by a coupling 162 to a linkage 50. Therefore, as will be considered in detail, as the spool valve 134 is positioned by the hydraeric pressure control signal in the line L1, the actuator A1 similarly moves the linkage 50.

As indicated, the position of the spool valve 134 is sensed by the transducer X1. Specifically, the rod 136 is connected to a flapper 164, the other end of which extends to a pivot mount 166. The flapper 164 is thus fixed between a spring 168 extending to the body 130 and a spring 170 extending to a bracket 172. A pair of nozzles 174 and 176 in opposing relationship then develop inverse pressures indicative of the position of the spool valve 134. The nozzle 174 is formed in the body 130 and is connected through an orifice 180 to the source of pressure PS1. The nozzle 176 is similarly connected to the source of pressure PS1 through an orifice 182. As a result of the operation of the flapper 164 with the orifices 180 and 182, the hydraeric pressure in the chambers 184 and 186 (adjacent the nozzles 174 and 176 respectively) manifest the position of the spool valve 134. The hydraeric pressure in the chamber 186 varies as the flapper 64 is moved to the right, coinciding with similar movement of the spool valve 134. That pressure is applied through a duct 188 to the spool valve 134 in opposition to the pressure from the line L1. As a result, a feedback force is applied to stabilize the spool valve 134.

The hydraeric pressure signal developed in the chamber 184 is inverse to the feedback signal and is applied as a hydraeric pressure monitor signal in the line H1 to a comparator system generally indicated by the numeral 56. The hydraeric pressure monitor signal in the line H1 is compared with similar pressure signals to detect a nonconforming signal and thereupon disable the associated control chain. Of course, various forms of comparators are well known in the prior art. Furthermore, various numbers of the monitor signals may be variously compared; however, for purposes of illustration, only, a comparison apparatus is represented in FIGURE 2 for performing a comparison between the hydraeric pressure monitor signals in lines H1, H2 and H3 and for developing signals indicative of a nonconforming monitor signal to thereby actuate the lock-out apparatus for the associated control chain.

Considering the illustrative system as represented in FIGURE 2 the pressure signal in line H1 is applied as one input which may be opposed by the pressure signal in the line H2. The pressure in the line H3 may then be opposed by the pressure in line H2 so that as long as the pressures in lines H1 and H2 balance; and the pressures in lines H2 and H3 balance, the comparator indicates no malfunction. However, if any unbalance occurs, a signal appears in one of the output lines 230, 231 or 233 to indicate the failing chain. As well-known in the prior art, nonconformity of any of the three chains as reflected in the monitor signals in the lines H1, H2 or H3 can be detected by two balancing units (as across pistons of the type shown in FIGURE 3) to indicate the nonconforming chain. Specifically, if the comparison of the pressures in lines H1 and H2 indicates unbalance, while the other comparison indicates balance, the pressure in the line H1 indicates failure of the monitored chain. In another failure event, if the comparisons of the pressures in lines H1 and H2 as well as H2 and H3 both fail out of balance, then the nonconformity is indicated in the second chain monitored by the pressure in the line H2. The third possibility in the event of a nonconformity, is that balance remains between the pressures in the lines H1 and H2 but unbalance occurs between the pressures in lines H2 and H3 to manifest a failure in the chain monitored by the signal in the line H3.

The failure of the chain that is monitored by the pressure signal, for example, in H1 results in a pressure signal in the form of a pressure drop in the line 230. Similar failures in the chains monitored by the pressures in lines H2 and H3 are indicated by pressure drops in the lines 231 and 233 respectively. These lines are connected to the lock-out devices. Specifically for example, the line 230 passes to a lock-out device B1 entering a cylinder 232 that contains a piston 234 having one end connected to a latch 236 and another end connected through a valve rod 238 to a valve 240 which supplies the pressure PS1 from the main pressure source PS. The piston 234 is urged upwardly by a spring 242 contained within the cylinder 232. However, the force of the spring 242 is balanced by the pressure PS1 supplied above the piston 234 through a port 244. Therefore, if the line 230 carries a reduced pressure, the pressure above the piston 234 drops, permitting the spring 242 to lift the latch 236 into a tapered recess 248 formed in the body 130 which in receiving the latch 236 is centered in an ineffective position. As a result, the linkage 50 becomes neutrally positioned.

In view of the above structural description of the control chain of FIGURE 2, the operation may now be best understood by assuming certain initial conditions and pursuing the resulting effects. Therefore, assume initially that the flapper 108 (upper left) is displaced to the right obstructing the flow from the nozzle 120. As a result of that obstruction, the pressure in the chamber 128 rises and is applied through the transmission line L1 in the form of a hydraeric pressure control signal to the left side of the spool valve 134. The spool valve 134 is then displaced to the right (as shown) connecting the port 146 to the pressure source PS1, and connecting the line 156 to a relief channel R or port 144. As a result, the head end 148 of the actuator is pressurized while the drive end 154 is relieved. Because of the fixed relationship of the actuator piston 150 and the movable mount of the body 130, the entire body 130 is displaced to the right similarly moving the control surface (not shown) through the linkage 50.

Thus, the desired control operation is accomplished by the displacement of spool valve 134; however, furthermore, the displacement of the valve 134 develops a feedback signal and a monitor signal. That is, as described, displacement of the spool valve 134 to the right, results in an increase in the pressure within the nozzle 176 by moving the flapper 164, which pressure increase is applied through the line 188 as a feedback force to the spool valve 134. Concurrently, with this change, the pressure in the chamber 184 within the nozzle 176 is relieved affording a drop in the hydraeric pressure monitor signal carried in the line H1. That pressure drop is applied in the comparator to and assuming no malfunctions in the system, it will be balanced by a similar drop in the hydraeric pressure monitor signal in line H2 from another control chain. Similarly, the drop in the hydraeric pressure occurring in the monitor signal in the line H2 is balanced by an identical drop in the monitor signal in the line H3, etc. Providing all monitor signals vary similarly, the lines 230, 231 and 232 all remain pressurized. However, if for example the illustrated control chain fails, and therefore causes the hydraeric pressure monitor signal in the line H1 to drop to a very low level of pressure and in turn dropping the pressure in the line 230. As a result, the pressure PS1 in the cylinder 232 is relieved through the line 230 with the result that the piston 234 is driven upwardly by the spring 242 locking the body 130 in a neutral position and actuating the valve 240 to cut off the pressure PS1 for the associated control chain. Thus, the illustrated control chain is disabled while the other control chains continue to function accomplishing full control of the aircraft or other system undergoing control.

It is readily apparent, that the system hereof provides many advantages both as an individual control link or chain and furthermore in a group system as in a redundant composite system. Specifically for example it is readily apparent that the system hereof affords a fully hydraulic system of control which may be readily adapted for redundant modes of operation. Furthermore, the system hereof as indicated above is economical in operation, reliable, rugged and relatively simple in structure.

There has thus been described a specific embodiment of a control system incorporating the features hereof. Although certain details of this system have been specifically shown and described it is not to be taken as a limitation upon the scope of the present invention as defined in the appended claims.

What is claimed is:

1. A control system for positioning a movable member in response to applied signals, comprising: a first transducer means disposed in a first location remote from said movable member for receiving at least one control signal; body means disposed in a second location proximate said movable member; means coupling said body means to said movable member; a valve means disposed in said body means; a pressure transmitting line connected between said first transducer means and said valve means thereby to connect said valve means to receive said hydraeric pressure control signal, for physically displacing said movable member in accordance with said hydraeric pressure control signal, said pressure transmitting line being the only connection between said first transducer means and said body means; a second transducer means coupled to said valve means for providing a hydraeric pressure monitor signal in accordance with displacement of said valve means; and means for disabling said control system, operative under control of said hydraeric pressure monitor signal.

2. A system according to claim 1 wherein said first transducer means includes a flapper valve means, comprising a flapper member positioned by at least one control signal.

3. A system according to claim 1 wherein said valve means comprises a spool valve means controlled by said hydraeric pressure control signal, and an actuator means connected to be controlled by said spool valve means.

4. A composite system including a plurality of control systems of the type defined in claim 1, and which composite system further comprises means for comparing the hydraeric pressure monitor signals from each of said control systems whereby to selectively disable a nonconforming control system.

5. A composite system in accordance with claim 4, wherein said first transducer means each comprise a flapper valve, including a flapper and means for displacing said flapper in accordance with a mechanical signal and an electrical signal in combination.

6. A composite system in accordance with claim 4 wherein said valve means in each of said control systems comprises: a spool valve connected to be positioned in accordance with said control signal in said control system; an actuator connected to said movable member and controlled by said spool valve; and further wherein said second transducer means comprises a flapper valve having a flapper positioned by said spool valve.

7. A composite system including three independent control systems of the type defined in claim 1, each of said independent control systems separately linked to an element of said movable member, said composite system further including a comparator apparatus for comparing said hydraeric pressure monitor signals from each of said independent systems to selectively disable a nonconforming control system in a neutral position.

8. A composite system according to claim 7 wherein said three independent control systems respectively provide; first, second and third hydraeric pressure monitor signals, and wherein said comparator apparatus comprises hydraeric means for balancing said first signal against said second and said third signals to provide three signals indicative respectively of nonconformity of each of said control systems.

9. A system according to claim 1 wherein said valve further includes means to provide hydraeric amplification to displace said movable member.

10. A system according to claim 3 wherein said means for disabling is a latch means for locking said actuator in an ineffective position.

References Cited

UNITED STATES PATENTS

| | | | |
|---|---|---|---|
| 2,932,282 | 4/1960 | McKinley et al. | 91—45 |
| 3,095,784 | 7/1963 | Colhoun | 91—363 |
| 3,190,185 | 6/1965 | Rasmussen | 91—363 |
| 3,198,082 | 8/1965 | Kerris | 91—1 |
| 3,279,323 | 10/1966 | Asche | 91—363 |

PAUL E. MASLOUSKY, *Primary Examiner.*